Aug. 27, 1935.  W. F. FRASER  2,012,273
REVERSING MECHANISM FOR MACHINE TOOLS
Filed Aug. 27, 1928  3 Sheets-Sheet 1
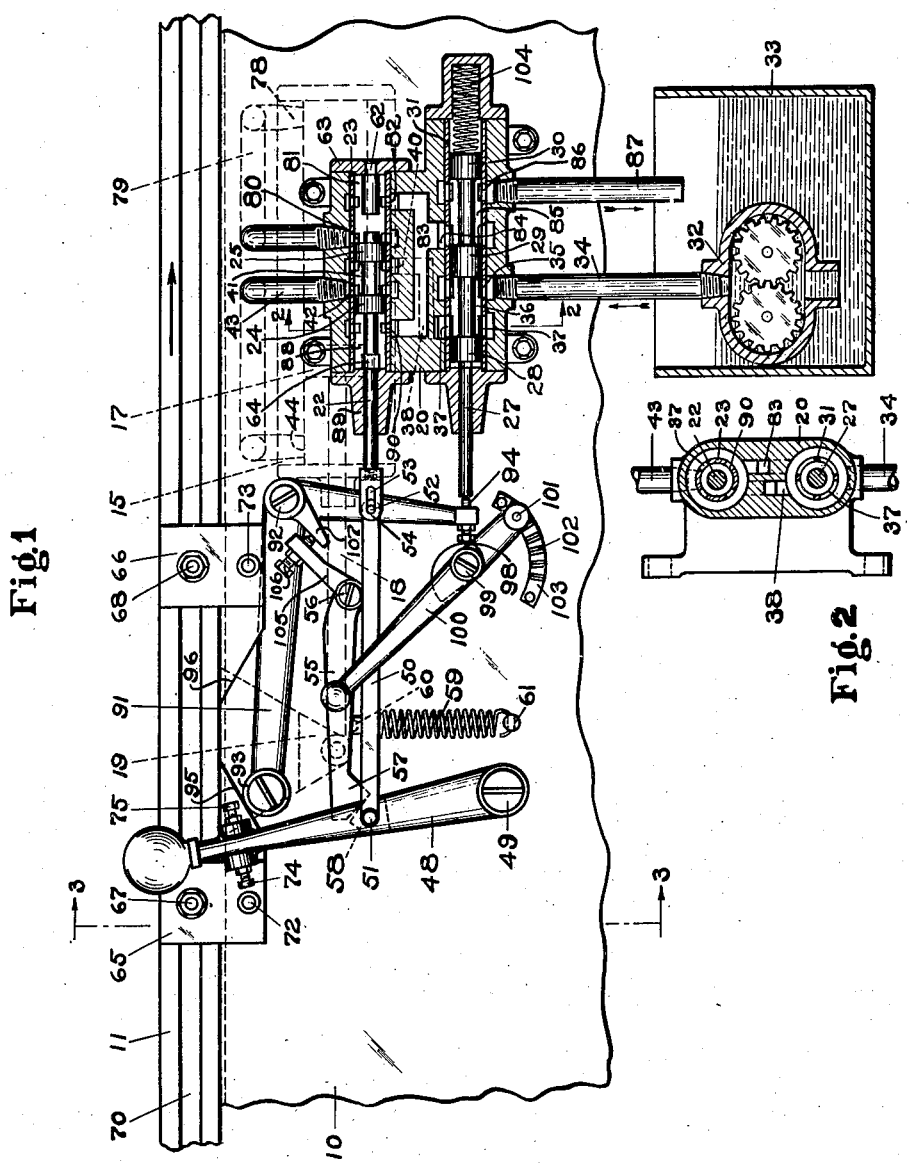
WITNESSES
Edward H. Goodrich.
Harold W. Eaton
Inventor
WARREN F. FRASER
By Clayton R. Jenks
Attorney Aug. 27, 1935.  W. F. FRASER  2,012,273
REVERSING MECHANISM FOR MACHINE TOOLS
Filed Aug. 27, 1928  3 Sheets-Sheet 2

WITNESSES
Edward H. Goodrich.
Harold W. Eaton

Inventor
WARREN F. FRASER
By Clayton R. Jenks
Attorney

Patented Aug. 27, 1935

2,012,273

UNITED STATES PATENT OFFICE 2,012,273

REVERSING MECHANISM FOR MACHINE TOOLS

Warren F. Fraser, Westboro, Mass., assignor to Norton Company, Worcester, Mass., a corporation of Massachusetts Application August 27, 1928, Serial No. 302,407

15 Claims. (Cl. 60—52)

This invention relates to machine tools and more particularly to a reversing mechanism operated by fluid under pressure.

Heretofore various reversing mechanisms have been devised for controlling the reciprocating movement of machine tool tables and the like by fluid under pressure in which a piston and cylinder mechanism were utilized to transmit movement to the table. These mechanisms have been fairly satisfactory on tables which are reciprocated at a moderate speed. In modern production grinding and other machine tool operations, it is essential to get the maximum production per machine. This demand has been partly met by increasing the speed of machine tool tables and also other parts of the machine to get the maximum production out of a given machine. It has been found that the ordinary fluid operated reversing mechanism as well as most mechanical mechanisms are not satisfactory where a rapidly moving table is employed due to undue shocks and vibrations incident to the reversal in direction of a rapidly moving table.

The previous mechanisms have relied upon a reversing valve to change the direction of flow of fluid at the end of the stroke of the table. When the table is moving rapidly and the reverse valve suddenly reversed to change the direction of flow of fluid as well as the travel of the table, the fluid is suddenly cut off on one side of the piston and permitted to enter the other side. The fluid, which is practically non-compressible, being suddenly cut off causes undue shocks and vibrations to be transmitted to the table as it is reversed. This detrimentally affects the machine operation being performed in that the shocks and vibrations are transmitted to produce chatter marks on the surface of the work.

It is one object of this invention to provide a fluid controlled apparatus to reciprocate the table at a rapid speed so that the table may be reversed in direction with an easy stopping and starting action whereby shocks and vibrations are reduced to a minimum.

It is another object of this invention to provide a suitable valve mechanism so that the speed of the table may be gradually retarded prior to reversal to cause an easy stopping of the table.

It is still another object of this invention to provide an automatic fluid pressure operated mechanism for reversing the movement of the table at the end of its stroke so arranged as to gradually retard the movement of the table prior to reversal and to thereafter accelerate the movement of the table to its normal speed.

It is a further object to provide a manually operable mechanism so that the operator may at any time during the table travel reverse the direction of movement of the table without undue shocks and vibration and cause the table to reverse at approximately a predetermined position.

It is still a further object of this invention to provide suitable adjustments for the throttle valve mechanism so that the normal speed of the table may be adjusted and also so arranged as to adjust the extent of the throttling action during the reversing period.

As illustrated in the drawings, a mechanism has been shown disclosing one embodiment of the invention. It should be understood that applicant does not wish to be limited to this particular embodiment of his invention but that this invention covers broadly any mechanism embodying the subject matter of the claims appended hereto. In the drawings in which like reference numerals indicate like parts:

Fig. 1 is a fragmentary front elevation of a machine tool embodying this invention, having parts broken away and shown in section to more clearly illustrate the construction;

Fig. 2 is a sectional view through the valve mechanism taken approximately on the line 2—2 of Fig. 1;

Figure 3:
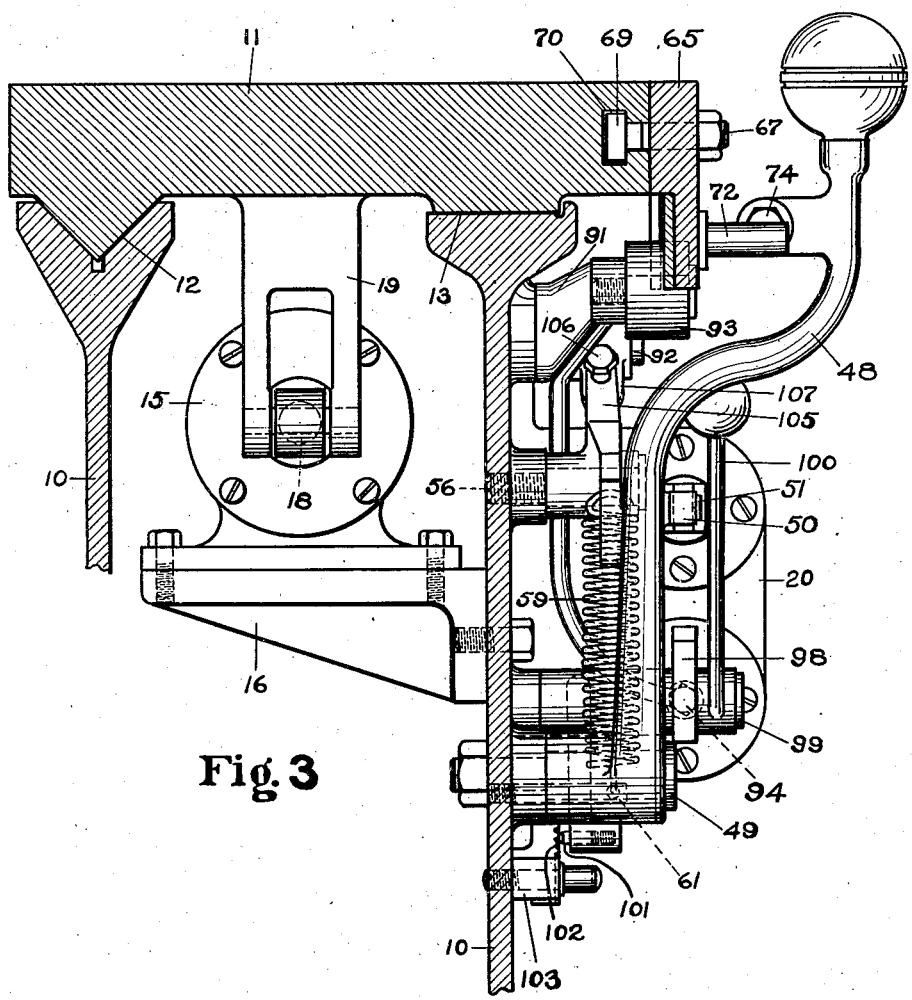
Fig. 3 is an enlarged fragmentary sectional view taken through the base of the machine approximately on the line 3—3 of Fig. 1 showing the valve and control mechanism in elevation.
Figure 4:
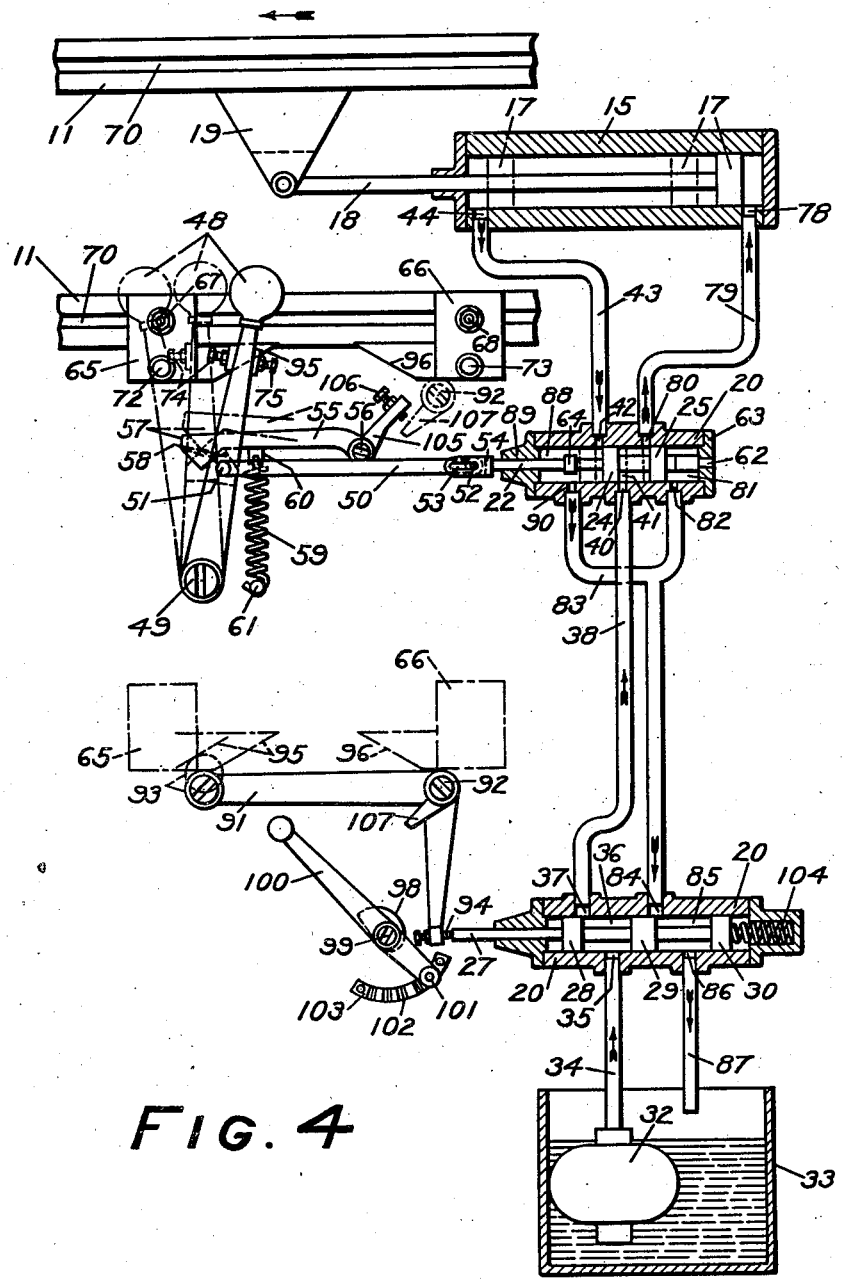
Fig. 4 is a diagrammatic view of the hydraulic system, showing the valves in position as the table starts its movement towards the left, as viewed in Figs. 1 and 4.

This invention consists broadly in a fluid operated mechanism arranged to reciprocate a machine table at a rapid speed but arranged so that the reversal in direction of travel may be obtained without shocks and vibrations. A valve mechanism is provided which is automatically operated to control the admission of fluid to each end of said mechanism to cause a reversal in the direction of travel of the table at the desired point. Cooperating with the reversing valve is a throttling device arranged to throttle the fluid entering and leaving the system to cause an easy starting and stopping action at reversal. This mechanism comprises a throttle valve arranged to regulate the normal speed of the table and also arranged so that it may be gradually closed prior to reversal and gradually opened after reversal to retard and accelerate the movement of the table during the period of reversal to effect an easy stopping and starting action. The throttle valve is so arranged as to throttle the exhaust of fluid from the cylinder, and preferably to throttle the inlet of fluid to the cylinder simultaneously with the control of the exhaust of fluid, so as to cause the table to stop and reverse at substantially a predetermined point at each reversal. This invention includes an automatic or manual actuation of the control mechanism, either of which operates to produce the desired results.

In accordance with this invention, a machine tool is provided with a base 10 and a reciprocable table 11 adapted to slide on the usual V-way 12 and flat-way 13. To reciprocate the table 11 a mechanism operated by fluid under pressure such as a chamber having a member movably mounted therein for actuation by said pressure may be utilized. As illustrated in the drawings, a cylinder chamber 15 is supported by brackets 16 bolted to the inner portion of the base 10. A piston 17 is slidably mounted within the cylinder 15 and is provided with a piston rod 18 connected at its outer end to a bracket 19 depending from the table 11. It will thus be seen that any movement of the piston within the cylinder is transmitted to produce corresponding movement of the table 11.

To control the movement of the piston within the cylinder, a valve mechanism may be utilized which is arranged to produce a gradual retardation and acceleration of the moving part when reversed in direction of travel. As shown in the drawings, a valve mechanism 20 is bolted to the front of the machine base. The valve mechanism 20 comprises two valves, namely, a reversing valve 22 arranged to control the direction of flow of fluid to and from the cylinder 15 and a throttle valve 27, interposed between the reversing valve and the source of supply, to control the speed of the table and also arranged to permit a gradual retardation and acceleration of the movement of the table prior to and after reversal to minimize shocks and vibrations. This mechanism comprises a reverse valve 22 which is slidably mounted within the sleeve 23. The valve member 22 is of the balanced piston type and is provided with a pair of pistons 24 and 25 which are adapted to regulate the flow of fluid through said valve. The throttle valve 27 is provided to vary the amount of fluid entering and leaving the system. This valve is of the same type and is formed with three pistons 28, 29 and 30 which slide within the sleeve 31 to simultaneously throttle both the intake and exhaust of fluid to the reverse valve, thereby permitting a more uniform control of the table speed.

Any suitable source of fluid under pressure may be utilized to supply and operate the system, such as a pump 32 in the base to force fluid from a reservoir 33 in the base to the throttle valve, reversing valve and to the cylinder. This part of the mechanism has been illustrated only diagrammatically since it is old and well known in the art, and is not considered part of applicant's invention. Fluid entering the system passes through a conduit 34 and a port 35 into a chamber 36 between the pistons 28 and 29 of the throttle valve 27. The inlet port 35 may comprise a single opening or a plurality of openings arranged about the sleeve as shown in the drawings. The fluid under pressure passes through the chamber 36 and is forced upwardly through a port 37 in the sleeve 31 into a passage 38 as shown in dotted lines in Fig. 1. This passage conveys fluid through a port 40 in the sleeve 23 into a chamber 41 between the pistons 24 and 25 (as shown in Fig. 1). Fluid passes through this chamber and is forced outwardly through the port 42 in sleeve 23, the conduit 43 and the port 44 into the left-hand end of cylinder 15 as viewed in Fig. 1. The fluid entering and passing through the valves in this direction forces the piston 17 toward the right as viewed in Fig. 1 and transmits a corresponding movement to the table 11 through the previously described connections.

In order that the table may be reversed automatically at the end of the desired stroke, a mechanism is provided to operate the reversing valve at the desired time to change it to its opposite position and thereby reverse the flow of fluid to the cylinder 15. As shown in the drawings, I provide a reversing lever 48 which is mounted on a stud 49 on the front of the base 10. A link 50 is pivotally connected to the lever 48 by a stud 51. The other end of the link 50 is provided with a pin 52 which is slidably mounted in an elongated slot 53 in the member 54 on the end of the valve 22. The elongated slot is provided to permit a movement of the reversing lever 48 without transmitting movement to the reversing valve.

A load and fire mechanism is provided to hold the lever 48 in the desired position to control the reversing valve 22. As shown in the drawings, a lever 55 is pivotally mounted on a stud 56 and has at its other end a V-shaped projection 57 adapted to contact with a similarly shaped projection 58 on the rear side of the lever 48. The lever 55 is preferably under tension so that the projection 57 is held in contact with the projection 58. As shown in the drawings, one end of a spring 59 is connected to a pin 60 on the lever 55 and its other end is connected to a pin 61 on the front of the machine base. It will be readily apparent from this construction that as the operator moves the lever 48 toward the right, as viewed in Fig. 1, the projection 58 will coact with the V-shaped end 57 to raise the lever 55 and thereby increase the tension on the spring 59. This movement continues until the high point on the projection 58 passes the high point on the projection 57 at which time the released tension of the spring rapidly moves the valve 22 into the reverse position. The elongated slot 53 is provided so that the lever 48 is permitted to move until the high point on the projection 58 passes the high point on the projection 57 without transmitting any movement to the reversing valve 22.

A stop pin 62 is provided in the cylinder head 63 of the reversing valve 22 to limit the movement of the valve toward the right so as to properly position the pistons thereon relative to the ports in the sleeve 23. A collar 64 is provided on the valve stem 22 so positioned as to limit the movement of the valve toward the left to similarly position the valve relative to the corresponding ports in the sleeve.

In order that the lever 48 may be shifted automatically at the desired point, a pair of adjustable dogs 65 and 66 are provided which are supported by the bolts 67 and 68 having their heads 69 slidably mounted in the T-slot 70 formed in the front edge of the machine table. The dogs 65 and 66 are provided with pins 72 and 73 respectively which are adapted to contact with the adjustable screws 74 and 75 on the reversing lever 48.

Assuming the table to be traveling in the direction of the arrow (Fig. 1), this movement continues until the pin 72 on the dog 65 contacts with the screw 74 on the lever 48 forcing it toward the right and moves the link 50 and pin 52 which slides freely within the elongated slot 53. This movement continues until the high point on the projection 58 passes the high point on the V-shaped end 57 at which point the released tension of the spring 59 acts to rapidly throw the reversing valve 22 toward the right and thereby change the direction of flow of fluid to and from the cylinder 15.

While the fluid is flowing through the conduit 43 through the port 44 into the left-hand end of the cylinder 15, it is exhausting from the other end of the cylinder through a port 78 and a conduit 79 through a port 80 in sleeve 23 into a chamber 81 between the piston 25 and the cylinder head 63. The fluid then passes through an exhaust port 82 in sleeve 23 and a passage 83 to the throttle valve 27. The exhaust fluid enters the throttle valve through a port 84 in sleeve 31 into a chamber 85 between pistons 29 and 30 and passes out of this chamber through a port 86 in sleeve 31 and conduit 87 into the reservoir 33.

When the reversing valve 22 moves toward the right into a reverse position, the fluid passes through the throttle valve 27 in the same direction and then through port 40 into the chamber 41 between the pistons 24 and 25 and out through a port 80 in sleeve 23 and the conduit 79 and through the port 78 into the right-hand end of cylinder 15, as viewed in Fig. 1. This movement forces the piston 17 toward the left and transmits a corresponding movement to the table 11. In this position of the reversing valve, fluid is exhausted from the left-hand end of the cylinder 15 through port 44, conduit 43, port 42 in the sleeve 23 into a chamber 88 between the piston 24 and a cylinder head 89. The fluid is then forced through a port 90 into the passage 83 and port 84 in the sleeve 31 into the chamber 85 between the pistons 29 and 30 and then exhausts through port 86 and conduit 87 to the reservoir 33.

As shown in Fig. 1, the throttle valve is wide open so as to permit a maximum flow of fluid through the intake and exhaust ports to obtain a maximum speed on the work table. By adjusting the position of the throttle valve 27, that is, by moving it toward the right, both the intake and exhaust ports may be throttled to give the desired speed to the reciprocable table.

To obtain an easy stopping and starting of the table during the period of reversal, a mechanism is provided to gradually close and open the throttle valve so as to retard and accelerate the movement of the table before and after the reversing valve is shifted into its reverse position. As shown in the drawings, a bell crank lever 91 is pivoted on a stud 92 on the front of the machine base. One arm of the bell crank is provided with a follower roller 93, the other end is provided with an adjustable screw 94 arranged to contact with the end of the throttle valve 27 so that any movement of the lever 91 is transmitted to give a corresponding movement of the throttle valve.

In order that the throttle valve may be moved automatically in timed relation with the movement of the reversing valve, a pair of cam plates 95 and 96 are provided and mounted on the dogs 65 and 66 respectively. As the table 11 moves toward the right, as viewed in Fig. 1, the cam 95 contacts with the follower roller 93 on the bell crank lever 91 before the pin 72 contacts with the screw 74. As the table continues its movement toward the right, the cam 95 forces the roller 93 downwardly, thereby rocks lever 91 and transmits motion to the adjustable screw 94 and moves the throttle valve 27 toward the right to gradually close the throttle valve. The throttling movement may be controlled as desired by varying the shape of the cams 95 and 96. It will be readily seen from this construction, that the throttle valve is closed gradually to check the flow of fluid passing through the hydraulic system and to slow down the movement of the table 11 before the load and fire mechanism operates to shift the reversing valve 22 into a reverse position. After the reversing valve has shifted, the fluid starts flowing in the opposite direction through the reversing valve and cylinder and operates to move the table 11 in the opposite direction. As this movement continues, the roller 93 rides up the face of the cam 95 and gradually opens the throttle valve thereby increasing the flow of fluid through the hydraulic system and accelerating the movement of the table to its normal speed.

The table continues to move toward the left, as viewed in Fig. 1, until the follower roller 93 contacts with the cam 96 which acts to give a similar throttling action before and after the reversing valve 22 is shifted into a reverse position. This cycle of operation is continued at each reversal of the table.

A stop mechanism is preferably provided to limit the movement of the throttle valve 27 in a direction toward the left so that the normal speed of the table may be readily adjusted. As shown in the drawings, this comprises a cam 98 rotatably mounted on the stud 99 which is controlled by a lever 100. The lower end of the lever 100 is provided with a spring pressed plunger 101, the details of which have not been shown since these are old and well known in the art. This plunger 101 is adapted to engage notches 102 in the arcuate member 103. It will be readily apparent from this construction, that by moving the lever 100 toward the right, the cam 98 will turn and move the throttling valve. This adjustment is provided so that the throttling valve may be positioned to give the desired normal speed to the table 11.

A spring 104 is provided at the end of the valve 27 so as to maintain the valve stem in contact with the adjustable screw 94 and also to maintain the head of the screw 94 in operative engagement with the cam 98. The cam 98 is adjusted to the desired position to give the proper speed to the table and is then left in adjusted position.

It may be desirable to vary the amount of throttling movement of the valve 27 during the reversal period. The adjustable screw 94 is provided for this purpose. By turning this screw, the ends of which are fixed relative to the cam 98, the position of the bell crank lever 91 changes to vary the point at which the roller 93 contacts with the cams 95 and 96 relative to the pins 72 and 73 striking the screws 74 and 75 on the reversing lever 48. By this adjustment the operator may determine the amount of the gradual slowing down of the table prior to the throwing of the reversing valve to give the desired easy stopping and starting action to the table.

In certain grinding operations or other machine tool operations, it may be desirable to control the movement of the table manually so that at any time during the normal stroke of the table, it may be reversed without waiting for the dogs to operate and automatically reverse the table. To this end, a suitable manual control is provided, supplementing the mechanism heretofore described so that the throttle valve 27 may be closed gradually when the operator swings the reversing lever 48 by hand. The lever 55 is preferably formed as a bell crank lever having a short arm 105 provided with an adjustable screw 106 adapted to contact with a lever 107 which is integral with the bell crank lever 91. As the operator grasps the reversing lever 48 and moves it toward the right, as viewed in Fig. 1, the projection 58 on the lever coacting with the V-shaped end 57 of the lever 55 rocks the lever about its stud 56. This movement acting through the lever 105 and screw 106 swings the lever 107 and bell crank 91 to slide the throttle valve 27 toward the right and thereby throttle the fluid passing through the valve. By this mechanism, the operator may reverse the table at any time during its stroke without causing undue shocks and vibration inasmuch as the throttle valve 27 is actuated by the manual movement of the reversing lever 48 to slow down the movement of the table 11 before the reversing valve is shifted.

In the operation of my device, the operator opens the valve controlling the fluid pressure line or starts the pump in motion which admits fluid through the throttle valve 27 and the reversing valve 22 to reciprocate the table 11. The operator then moves the lever 100 to adjust the position of the throttle valve 27 to give the desired table speed for the operation to be performed. After this adjustment is made, the operator may then adjust the position of the screw 94 relative to the bell crank lever 91 to vary the amount of throttling movement at reversal to give the desired retarding and accelerating action just prior to and after the reversing valve 22 is shifted. After these adjustments are made, the dogs 65 and 66 may be adjusted relative to the table 11 to give the desired length of stroke and to position the table relative to the work. The screws 74 and 75 may be adjusted relative to the lever 48 to vary the time between which the cam 95 strikes the roller 93 and the pin 72 striking the screw 74. By this adjustment, the operator may vary the amount of movement of the table between the beginning of the throttle action and the shifting of the reverse valve.

Having thus described the invention, what is claimed as new and desired to secure by Letters Patent is:

1. A reversing mechanism for a machine tool table comprising a fluid pressure actuated motor connected to move the table, a source of fluid pressure, means including a reversing valve for admitting and exhausting fluid under pressure to said motor, a throttle valve controlling the exhaust of fluid from the motor, means to adjust the position of said throttle valve to control the normal table speed, and means controlled by the table movement for gradually closing said throttle valve to cause an easy reversal of the table.

2. A reversing mechanism for machine tool tables comprising a fluid chamber, a member movably mounted within said chamber and operatively connected to reciprocate the table, a reversing mechanism including a valve operatively connected to admit fluid under pressure to either end of said chamber and a throttle valve arranged to simultaneously throttle the intake and exhaust of fluid to and from the reversing valve.

3. A reversing mechanism for machine tool tables comprising a cylinder and piston connected to reciprocate said table and a reversing mechanism including a valve operatively connected to admit fluid under pressure to either end of said cylinder and a throttle valve arranged to simultaneously throttle the inflow and exhaust of fluid to and from the reversing valve.

4. A reciprocating mechanism for machine tool tables comprising a cylinder and piston arranged to reciprocate said table, a reversing mechanism including a valve operatively connected to admit fluid under pressure to either end of said cylinder, a throttle valve controlling the exhaust of fluid from the cylinder, means to adjust the throttle valve to control the flow of fluid and thereby produce the desired table speed, and means actuated by the table movement to gradually close said throttle valve to retard the movement of the table at reversal.

5. A reversing mechanism for machine tool tables comprising a cylinder and piston arranged to reciprocate said table, a pump to force fluid under pressure to said cylinder, a fluid reservoir, a reversing mechanism including a valve operatively connected to admit fluid under pressure to either end of said cylinder, a throttle valve arranged to simultaneously throttle the inflow and exhaust of fluid, and means to gradually close said throttle valve to retard the movement of the table at reversal.

6. A reversing mechanism for machine tool tables comprising a cylinder and piston arranged to reciprocate said table, a source of fluid under pressure, a reversing mechanism including a reversing valve operatively connected to admit fluid under pressure to either end of said cylinder, a throttle valve arranged to simultaneously throttle the inflow and exhaust of fluid, means to adjust the position of said throttle valve to give the desired table speed, and means to gradually close and open said throttle valve to gradually retard and accelerate the movement of the table at reversal.

7. A reversing mechanism for machine tool tables comprising a cylinder and piston arranged to reciprocate said table, a source of fluid under pressure, a reversing mechanism including a valve actuated by said table to change the direction of flow of fluid under pressure to said cylinder, a throttle valve arranged to control the exhaust of fluid from the reversing valve, means actuated by movement of said table to gradually open said throttle valve at reversal at each end of the table stroke to cause an easy starting of the table and means to adjust the extent of movement of the throttle valve to regulate the reversal of the table at each end of its stroke.

8. A reversing mechanism for machine tool tables comprising a cylinder and piston arranged to reciprocate said table, a pump to force fluid under pressure to said cylinder, a fluid reservoir, a reversing mechanism including a valve to change the direction of flow of fluid under pressure to said cylinder, a lever to actuate said valve, adjustable dogs on said table to actuate said lever, a throttle valve arranged to control the flow of fluid through the reversing valve, means to adjust the position of said throttle valve to control the normal speed of the table and means actuated by said table to gradually close said throttle valve prior to reversal to retard the speed of the table.

9. A reversing mechanism for machine tool tables comprising a cylinder and piston arranged to reciprocate said table, a pump to force fluid under pressure to said cylinder, a fluid reservoir, a reversing mechanism including a valve operatively connected to permit the flow of fluid under pressure to either end of said cylinder, a throttle valve to control the flow of fluid through said reversing valve, and a manually operable lever connected to successively and gradually close said throttle valve to slow down the speed of the table and thereafter to shift said reversing valve to change the direction of travel of the table.

10. A reversing mechanism for machine tool tables comprising a cylinder and piston arranged to reciprocate said table, a pump to force fluid under pressure to said cylinder, a fluid reservoir, a reversing mechanism including a valve to change the direction of flow of fluid under pressure to said cylinder, a throttle valve arranged to control the flow of fluid through the reversing valve and cylinder, and a manually operable lever connected to actuate said reversing valve, and means actuated by said lever to gradually close and open the throttle valve prior to and after the operation of the reversing valve.

11. A reversing mechanism for machine tool tables comprising a cylinder and piston arranged to reciprocate said table, a source of fluid under pressure, a reversing mechanism including a valve operatively connected to admit fluid under pressure to either end of said cylinder, a throttle valve arranged to control the flow of fluid through the reversing valve, manual means to adjust the position of said throttle valve to control the normal speed of the table, and a manually operable lever connected and arranged to gradually close the throttle valve to retard the speed of the table prior to reversal and to actuate said reverse valve.

12. A reversing mechanism for machine tool tables comprising a cylinder and piston arranged to reciprocate said table, a source of fluid pressure, a reversing mechanism including a valve operatively connected to admit fluid to either end of the cylinder, a throttle valve to control the flow of fluid through the reversing valve, means to adjust the position of said throttle valve to regulate the normal speed of the table, and means operable by movement of said table to gradually close the throttle valve prior to reversal to slow down the movement of the table, and manually adjustable means to vary the extent of movement of said throttle valve.

13. A reversing mechanism for machine tool tables comprising a cylinder and piston arranged to reciprocate said table, a pump to force fluid under pressure to said cylinder, a fluid reservoir, a reversing mechanism including a valve arranged to control the flow of fluid under pressure to either end of said cylinder, a throttle valve to control the flow of fluid through said reverse valve, adjustable means to position said throttle valve to control the normal speed of said table, a lever to actuate said reverse valve, dogs on the table to actuate said lever, a second lever arranged to actuate said throttle valve, cams on said table arranged to gradually close and open said throttle valve prior to and after reversal to retard and accelerate the table at reversal, and means to adjust the amount of throttling movement of said valve to determine the speed of the table at the point of reversal.

14. A reversing mechanism for machine tool tables comprising a cylinder and piston arranged to reciprocate said table, means including a pump to force fluid under pressure to said cylinder, a reversing mechanism including a valve to change the direction of flow of fluid under pressure to said cylinder, a throttle valve arranged to control the flow of fluid through the reversing valve, means including a cam to adjust the position of said throttle valve to control the normal table speed, means actuated by movement of the table to gradually close the throttle valve and slow down the table and to thereafter actuate said reverse valve to change the direction of travel of the table, and manually adjustable means to vary the extent of movement of said throttle valve.

15. A reversing mechanism for machine tool tables comprising a fluid chamber, a member movably mounted within said chamber and operatively connected to reciprocate the table, a reversing mechanism including a valve operatively connected to admit fluid under pressure to either end of said chamber, a throttle valve arranged to simultaneously throttle the intake and exhaust of fluid to and from the reversing valve, means to gradually close and open said throttle valve to gradually retard and accelerate the movement of the table at reversal, and means to adjust the extent of movement of the throttle valve to regulate the reversal of the table.

WARREN F. FRASER.